Patented Aug. 19, 1947

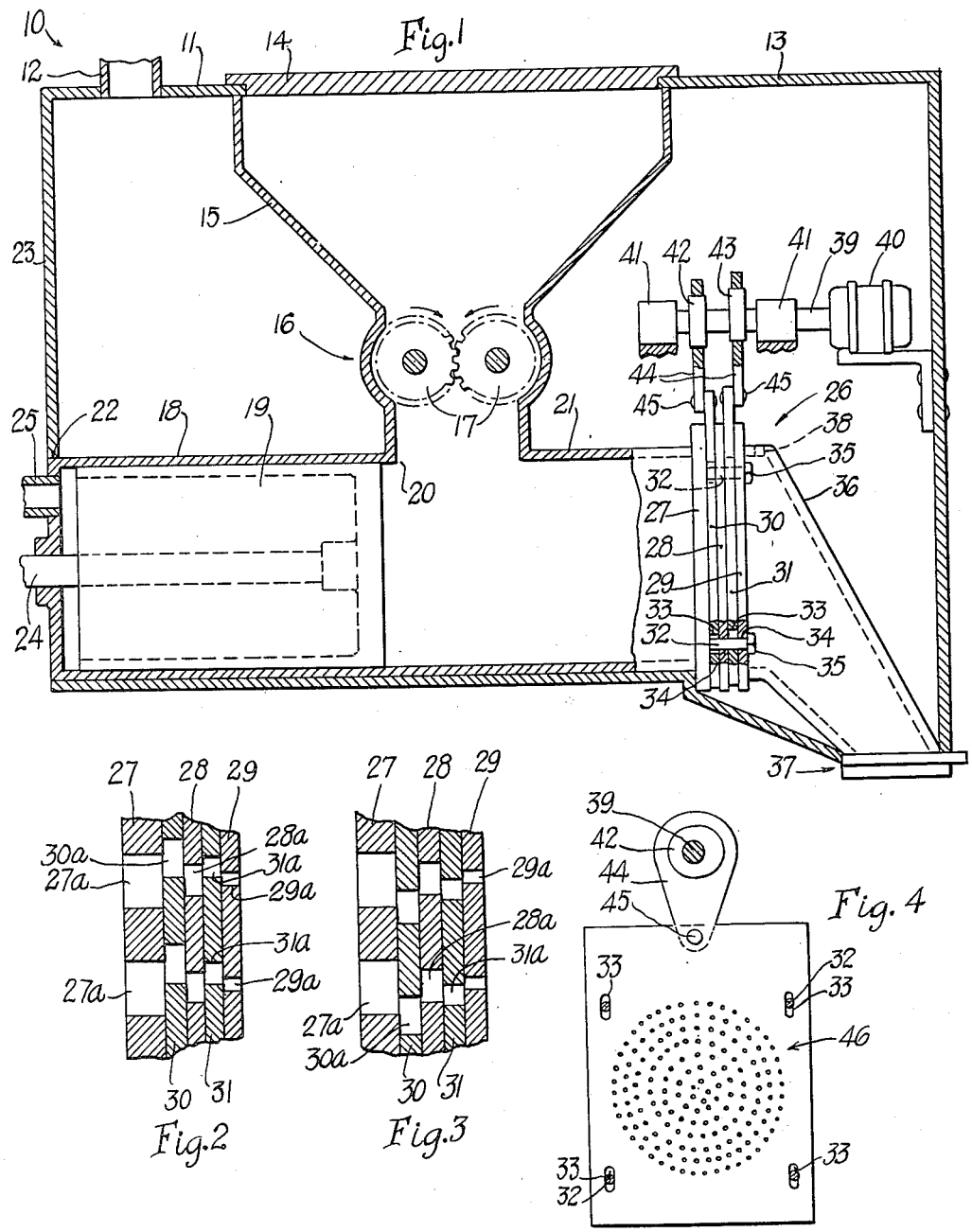

2,425,912

UNITED STATES PATENT OFFICE 2,425,912

APPARATUS FOR GRINDING FOOD IN A VACUUM CHAMBER

Harry A. Appel, Bronx County, N. Y., and Emile J. Le Blanc, Middlesex County, Mass.

Application May 23, 1944, Serial No. 536,978

2 Claims. (Cl. 146—78)

This invention relates to fresh, uncooked natural foods, and to methods and apparatus for producing and preserving the same.

One object of the invention is to provide an uncooked, liquefied food consisting of a natural product, protein or carbohydrate, or mixtures thereof, suitably enriched by vitamins, minerals or both, in finely comminuted form dispersed or suspended in its own natural juices, adapted to be preserved in completely sterile, vacuum-packed condition for instant use.

Another object of the invention is the provision of an improved method of treating foods including grinding and finely comminuting the same and conserving the juices of the food under continuous vacuum treatment for ultimate delivery into suitable cans, and packaging of the food including its juice in vacuum containers.

Another object of the invention is to provide an apparatus of improved character for producing the novel foods according to the methods described, and particularly for grinding and then for comminuting the foods under constant vacuum, with the comminution being effected in a series of steps with increasing fineness, with minute openings in plates certain of which are slidable with respect to others to cause a combined cutting, crushing and tearing effective for foods of every conceivable texture, while maintaining a continuous travel of the food under powerful pressure, and vacuum, the particles of the food being capable of being uniformly carried throughout by the food juices expressed.

Heretofore, certain foods have been sliced and packaged with various liquids in vacuum cans. Such foods were conventional in character and the only improvement involved resided rather in the convenience of the usual vacuum can. Where cooking was required, such foods were generally precooked, often with destruction of valuable vitamins and other constituents and deterioration of various food qualities. Where these foods were cooked by the ultimate consumer, the same things frequently happened due to high temperatures used or excessive cooking employed. Such foods had to be chewed and masticated like any others and hence were of no assistance to persons accustomed to fast eating or swallowing of their foods, with resultant indigestion and other gastric disturbances. By the present invention, a liquefied food is provided whereby proper digestion and absorption of the nutrients are assured, and so unusual and advantageous are the results obtained, that cooking even in the case of meats may be reduced to a minimum, and often wholly dispensed with. Food values are thus preserved in their natural, raw or ripe state, without any dissipation of the natural juices, and yet the product suitably seasoned and prepared may be maintained for a long time in vacuum cans, ready for immediate use.

It is accordingly a further object of the invention to provide improvements in this art for avoiding the disadvantages heretofore encountered, and for realizing the advantages mentioned.

Other objects and advantages of the invention will become apparent as the specification proceeds.

With the aforesaid objects in view, the invention comprises the novel features, combinations and arrangements of parts hereinafter described in their preferred embodiments, pointed out in the subjoined claims, and illustrated in the annexed drawing, wherein like parts are designated by the same reference characters throughout the several views.

In the drawing:

Figure 1 is a schematic view with parts in section and parts in elevation showing an apparatus embodying the invention.

Figs. 2 and 3 are enlarged fragmentary sectional views showing details of the comminuting openings in different positions.

Fig. 4 is a view in front elevation of a comminuting plate.

The advantages of the invention as here outlined are best realized when all of its features and instrumentalities are combined, but, useful embodiments may be produced involving less than the whole.

It will be obvious to those skilled in the art to which the invention appertains, that the same may be incorporated in several different constructions. The accompanying drawing, therefore, is submitted merely as showing a preferred exemplification of the invention.

Referring now more particularly to the food, the same may consist of fruits, vegetables, legumes, or meats, or combinations thereof, and in general of protein or carbohydrate substances which are susceptible to the process described. Such foods, including their so-called roughage, are liquefied in their own juices, with the solid material finely comminuted into particles which may be only a few thousandths of an inch in size, and preferably do not exceed about one thirty-second of an inch in size. The liquefied food is of varying viscosity, and in fact the word "liquefied" is intended to include a jel-like consistency as well as rather low viscosities. The fats and natural flavors are retained, except that in the case of meats, bones and certain undesired fats may be removed, and in other foods various indigestable portions, such as the kernels or tough cores of fruits, may be removed. Where one would expect a finely divided mass of meat fat to separate out at the surface of the liquid, we have found that in a meat prepared according to this invention the viscosity of the liquid is such that the minute particles of fat remain dispersed or suspended in the liquid, often assisted by the fine particles of the meat.

While the food is thus liquefied in its own juice, other liquids or juices may be added to create any desired consistency. Vitamins and minerals may be added in evenly distributed condition so as to avoid any noticeable change in taste. Different combinations of foods may be made to produce a tasty, well balanced, suitably seasoned or flavored meal or course, as may be prescribed by expert dietitians, and special foods may be produced for people who suffer from diabetes and other ailments. The food is packaged in raw or uncooked condition and may be chilled or warmed to suit, and may be subjected to such cooking as is preferred, although moderate cooking will suffice even with meats, and may be dispensed with if preferred. No cooking need be practiced with fruits and vegetables. This food requires no chewing or mastication, since it may be drunk like ordinary tomato juice. Hence the difficulties which arise from rapid eating or swallowing of foods in their usual solid condition are avoided, and superior digestion and absorption of the entire values of the food results. This food, having all of these desirable qualities, is prepared and packaged free of oxidation, fermentation, decomposition, and is entirely proof against ptomaine effects, as it is prepared under continuous vacuum and sold in vacuum cans, where it is preserved in sanitary condition, ready for instant use.

According to our novel process, the food is first treated to remove bones, pits, shells and other inedible or undesirable constituents, and rendered wholly sanitary. A single food or a properly proportioned, seasoned and enriched food may be treated. This food is then coarse ground in a vacuum chamber, in which is also located the comminuting apparatus. From the grinder the food may pass directly to a pressure cylinder in which powerful pressure may be applied mechanically or hydraulically. Under this pressure the food is supplied to a comminuting head which divides the solids into very fine particles. The juice expressed in grinding and in comminuting flows along therewith to maintain all the constituents of the food for the final vacuum packing. A feature of the process is that the juice serves as a lubricant for the fine comminution. A preferred apparatus hereinafter described provides for comminution by driving the food through openings which may successively decrease in size for a graduated comminution. Also portions of the openings afford passages that increase and decrease in size to perform a combined cutting, crushing and tearing or abrading action to encompass the resistance of all manner of fibers and tissues, and this is another important feature of the process. Of course, the openings mentioned are very small in size, and the feed pressure is correspondingly high. While the feed pressure may be fixed, it preferably varies with different foods, their consistency and toughness. Still another feature of the process is that air is removed to a higher degree and in an easier and more rapid manner than was heretofore possible by reason of the fact that the solids are finely comminuted, thus releasing any entrapped particles of air. As the food passes from the minute orifices of the comminuting apparatus, the release of pressure and the effect of the vacuum is such as to cause the finest particles of air to be expelled immediately. Thus any possibility of oxidization or fermentation even in the slightest degree is reliably prevented.

Referring in detail to the drawing, 10 denotes an apparatus embodying the invention. The same may include a vacuum chamber 11, provided with a pipe 12 that may lead to an exhaust pump or other suitable source of vacuum. Formed in the top wall 13 of the chamber is an opening closed by a cover or door 14 which may be sealed in any well known manner to maintain the vacuum. Communicating with the opening is a hopper 15 leading to a coarse grinder 16. The latter may be conventionally indicated as comprising a pair of helical toothed rollers 17 having gear like interengagement so that only one of them need be connected to a rotary power source. The teeth constitute the grinding elements, effective upon rotation in either direction, but the most efficient grinding results being obtained by rotation as indicated by the arrows. The said grinder discharges into a cylinder 18 containing a reciprocating piston 19 that is of sufficient length to close the grinder outlet 20 and compress the material received by the cylinder portion 21. The cylinder 18 may extend through an opening 22 in the chamber wall 23 with which it has sealed engagement. The piston 19 may be actuated by a piston rod 24 driven by any suitable source of power. Preferably the advance stroke of the piston is caused by pneumatic or hydraulic pressure, as by a pipe 25 through which a pressure liquid flows into the cylinder 18; hence retraction of the piston may be caused by the piston rod 24 which may respond to a spring or weight or to a relatively small external power cylinder, and as these are conventional they are not shown. Where a liquid, such as an oil is used as the propellant, it may assist in sealing the vacuum in the chamber 11, and of course a neutral or edible oil may be used so that any leakage will not cause serious consequences. With the structure shown the pump serves to shift the ground material to the comminuting means and to impart a very high pressure thereto.

The comminuting means 26 may include a series of perforated plates in sliding engagement with each other; of these the plates 27, 28, 29 are stationary, and the plates 30, 31 are slidable. The plate 27 may be sealingly connected to the cylinder portion 21, and is sufficiently rugged to mount the other plates. Thus it may have fixed pins 32 which extend through guide slots 33 in the movable plates 30, 31 and through close fitting holes 34 in the plates 28, 29 to hold the same stationary. At their outer ends, the pins 32 may have heads or bolts 35 to maintain a precision contact at predetermined pressure between the several plates. Affixed to the outermost stationary plate 29 is a discharge nozzle 36 having any well known closable outlet valve means 37 for communicating a can with the nozzle to fill the can without destroying the vacuum. The chamber 11 extends into closed juxtaposition to the control means 37 and may have direct communication with the nozzle 36 as by a small vent opening 38 to maintain the vacuum against any leakage that may occur when the can is being filled, this vent opening being located remote from the path of flow of the comminuted materials. For reciprocating the slidable plates 30, 31, any suitable actuator means may be provided, such as a continuously driven shaft 39 operated by an electric motor 40, which may be located inside or outside of the chamber 11, preferably within the same to avoid the need for sealing the shaft. Said shaft may be mounted in bearings 41 and may have cams or eccentrics 42, 43 for connecting rods 44 that are pivotally engaged at 45 with the plates 30, 31.

The comminuting means comprises a field 46 of fine perforations as indicated in Fig. 4, each of the plates 27 to 31 being thus constructed. These openings successively decrease in size in the succeeding plates and are coordinated for a cutting, tearing and crushing of the material that is being comminuted. Thus the stationary plates have various holes 27a, 28a and 29a respectively, alined with each other. The movable plates 30, 31 have openings 30a and 31a respectively, but these are preferably out of alinement with each other, for which purpose the cams 42, 43 are out of phase, and may be at 90 degrees to each other. It is noted that there is a continuous gradation in size of the openings. The openings 30 and 31a successively come into alinement with the openings 27a, 28a and 29a for only a split second; for a longer time, their relationship is as shown in Fig. 2, providing a stepped formation, so that the resultant passage area is reduced in size. This is of advantage because results may be obtained finer than the size of the openings. Thus the communication between openings 31a and 29a is smaller than the extremely minute openings 29a. An extreme relative position of the openings is shown in Fig. 3, and it is seen that they never completely close, but are always open to a slight extent in order not to completely cut off the flow of material. But so closely do certain edges of the openings approach each other that there is a shearing of the material. Of course, there is a crushing of the material as openings move out of alinement with each other, and there is a tearing or abrasion of material as the same is squeezed against and past the sharp edges of the openings. As the openings come into alinement with each other flow resistance diminishes and they are quickly filled; then as the comminuting process continues, the flow resistance is further reduced. It is to be understood that the eccentricity at 42, 43 is sufficiently small commensurate with the openings, which at 31a may be only a few thousandths of an inch in diameter.

In use, the cover 14 is removed and the hopper 15 loaded with a large charge of food materials, and then the cover is closed. While the vacuum in chamber 11 is increased, the coarse grinder 16 begins to operate, and with the piston 19 at the left, discharges the food into the cylinder 18, 21. Then the piston is advanced under extremely high pressure, and with the shaft 39 rotating, the sliding plates 30, 31 reciprocate, as guided by the pins 32. The food pressed against the plate 27 gradually traverses the comminuting means through the holes in the several plates and is discharged with the expressed juice into the nozzle 36. Meanwhile, containers or cans are engaged with the outlet means 37 of the nozzle to fill the cans to the very top, under vacuum, so that when the cans are sealed there is no air present. In course of the comminution, with the cutting, crushing and tearing of the tissues, complete liberation of any entrapped air is assured so that an extreme degree of evacuation is obtained. By the provision of the vent opening 38, the vacuum is maintained at the outlet side to compensate for the filling of the comminuting holes by the food and air leakage at the control valve 37. As the highly compressed food leaves the comminuting means, the sudden expansion in vacuum further assures complete expulsion of air. So fine is the product delivered, that the solids are dispersed or suspended in their juices to thus produce the liquefied, natural food, packed to preserve the same for instant use, as hereinbefore described. Thus the apparatus 10 is capable of functioning according to our process for producing the novel foods as herein set forth.

We claim:

1. An apparatus for producing liquefied foods, including a vacuum chamber, a coarse grinder therein, a cylinder into which the grinder discharges, a power piston at one end of the cylinder, a comminuting means at the other end of the cylinder, the comminuting means and at least part of the cylinder being located in the vacuum chamber, and an outlet means for the comminuting means for discharging at will the solid particles and the expressed juices of the foods.

2. Apparatus including a comminuting means, and a pressure means for feeding foods to one side thereof, the comminuting means including a series of successive plates each having a field of perforations, alternate plates being movable relatively to the intervening plates in sliding engagement therewith, the perforations in the successive plates diminishing in size from the feeding side with the perforations in the last plate being minute, the perforations in the different plates being in register with each other, and means for actuating the different intervening plates to different extents so that the perforations of adjacent plates increase and decrease in register but are always maintained in register, whereby a continuous flow of the food occurs through the comminuting means in which the food is sheared, torn and crushed by the edges of perforations under the pressure of the pressure means, the actuating means including a rotary shaft having angularly spaced eccentric portions for moving the movable plates in out-of-phase relation to each other.

HARRY A. APPEL.
EMILE J. LE BLANC.

REFERENCES CITED

The following references are of record in the file of this patent:

UNITED STATES PATENTS

| Number | Name | Date |
| --- | --- | --- |
| 2,037,029 | Knowles | Apr. 14, 1936 |
| 1,586,893 | Gay | June 1, 1926 |
| 1,157,448 | Stottenberg | Oct. 19, 1915 |
| 679,884 | Burton | Aug. 6, 1901 |
| 1,156,096 | Price | Oct. 12, 1915 |
| 1,611,244 | Schmidt | Dec. 21, 1926 |
| 2,030,758 | Naturkacz | Feb. 11, 1936 |
| 2,303,021 | Butty | Nov. 24, 1942 |
| 1,036,870 | Masson | Aug. 27, 1912 |
| 1,977,644 | Paxton | Oct. 23, 1934 |

FOREIGN PATENTS

| Number | Country | Date |
| --- | --- | --- |
| 50,022 | Germany | Dec. 19, 1889 |